United States Patent [19]

Laughlin

[11] Patent Number: 5,696,645

[45] Date of Patent: Dec. 9, 1997

[54] APPARATUS FOR PROTECTING MEMORY DEVICES FROM EXTERNAL SHOCK FORCES BY USING AN INTEGRATING BAND PASS FILTER

[75] Inventor: Darren R. Laughlin, Albuquerque, N. Mex.

[73] Assignee: Maxtor Corporation, Longmont, Colo.

[21] Appl. No.: 430,269

[22] Filed: Apr. 28, 1995

Related U.S. Application Data

[63] Continuation of Ser. No. 141,870, Oct. 22, 1993, abandoned.

[51] Int. Cl.[6] .................................................. G11B 21/20
[52] U.S. Cl. ............................... 360/75; 360/69; 360/60
[58] Field of Search ............................... 360/60, 69, 75

[56] References Cited

U.S. PATENT DOCUMENTS

| | | | |
|---|---|---|---|
| 4,862,298 | 8/1989 | Genheimer et al. | 360/75 |
| 4,947,093 | 8/1990 | Dunstan et al. | 360/73.03 |
| 5,235,472 | 8/1993 | Smith | 360/69 |
| 5,272,576 | 12/1993 | Ohtsuka | 360/60 |
| 5,299,075 | 3/1994 | Hanks | 360/75 |
| 5,333,138 | 7/1994 | Richards et al. | 360/60 |

FOREIGN PATENT DOCUMENTS 4-9616  12/1993  Japan.

OTHER PUBLICATIONS

Sedral Smith, *Microelectronic Circuits* Third Edition, 1991, pp. 30–38, 781–785, 800–805.

*Primary Examiner*—Aristotelis M. Psitos
*Assistant Examiner*—Larry T. Cullen
*Attorney, Agent, or Firm*—Sheridan Ross P.C.

[57] ABSTRACT

Circuit for generating a write disable signal in response to an applied shock force. Angular displacements which indicate an excessive shock force are detected, and signal processed to determine whether or not a displacement will result from the shock force exceeding a threshold level. Low frequency displacements are de-emphasized, while higher frequency displacements in a passband of interest are integrated to obtain a displacement function. The displacement function is compared in a threshold detector with a reference threshold displacement level. Displacements which exceed the established threshold displacement will generate a write disable signal.

3 Claims, 3 Drawing Sheets

APPARATUS FOR PROTECTING MEMORY DEVICES FROM EXTERNAL SHOCK FORCES BY USING AN INTEGRATING BAND PASS FILTER

This is a continuation of application Ser. No. 08/141,870, filed on Oct. 22, 1993, now abandoned.

RELATED APPLICATIONS

This application is related to a patent application entitled SENSOR DEVICE FOR DETECTING ANGULAR MOTION, co-filed herewith in the name of the same inventor.

BACKGROUND OF THE INVENTION

The present invention is directed to protecting data storage devices from writing off-track or overwriting adjacent tracks when a shock force is experienced. Specifically, the apparatus disables writing by a read/write head of a spinning memory media when a shock force displaces the read/write head position with respect to the memory media.

Mass storage in data processing devices is typically implemented in a memory media which includes a spinning disk. Magnetic hard disk media provide high density data storage where space is a limiting factor. Currently a magnetic hard disk is capable of storing over 2 gigabytes. Access to specific data tracks of the hard disk media in which data is to be read from or written to is obtained by a read-write head positionable to the specific data track.

Positioning of the read-write head is accomplished with an actuator controlled by a servomechanism. The positioned read-write head detects tracking position indicia on each track. The servomechanism responds to the tracking position indicia to maintain the read/write head accurately aligned with respect to the track in response to minor disturbances to the spinning hard disk.

However, limits exist as to the ability of the servo mechanism to correct for displacements which occur between the track and the read-write head as a result of a sudden unanticipated shock force being applied to the spinning hard disk assembly.

This is especially true for hard disk mass storage devices used in laptop computers. Shock forces produce an angular displacement of the spinning hard disk track with respect to the read-write head. The angular displacement necessarily generates a tracking error between the read/write head and the track proportional to the length of the pivot arm supporting the read-write head.

Under these conditions, the servomechanism cannot respond to the displacement caused by a shock force, and a catastrophic overwrite may occur in adjacent tracks of the hard disk, obliterating data which has been previously written to the adjacent track of the hard disk. The overwrite results in serious damage to data files which significantly impairs the use of the device, or writing the present data off-track.

Protecting the spinning hard disk from such catastrophic overwrites can only be partially alleviated through mechanical absorption and other known techniques which attempt to insulate the hard disk assembly from such shock forces. It is clear that in the laptop computer application, more is needed in order to protect against catastrophic overwrites.

SUMMARY OF THE INVENTION

It is an object of this invention to protect an electronic system from the effects of an applied force.

It is a more specific object of this invention to generate an inhibit signal which can be used to turn off the current to a write head of a hard disk memory when a shock force is applied to the hard disk memory.

It is still another object of this invention to identify shock force displacements which occur within a frequency region outside the effective control bandwidth of the positioning servomechanism of a hard disk memory.

These and other objects of the invention are provided for by a motion sensor and signal processing circuit. A motion sensor is mechanically coupled to an electronic system and detects induced motion imparted to a platform supporting an electronic system such as a spinning hard disk memory. The sensor advantageously has a bandwidth which extends beyond the control bandwidth of the read/write head servomechanism. A signal processing circuit receives the sensor output signal and derives signals proportional to a track error experienced by the read/write head trying to track a spinning hard disk experiencing the shock force. The signal processing circuit receives the sensor output signal and determines if the drive has experienced a shock above the displacement threshold. The displacement threshold is selected to indicate a displacement beyond which the read/write head servo control system can effectively correct. Displacements which exceed the threshold trigger a WRITE INHIBIT command for instantly switching off the read/write head current.

The protection afforded by the invention prevents the unintentional writing of data to adjacent tracks of a disk memory. As many disk storage devices effectively compensate for low frequency shock-induced displacements, the invention advantageously looks at the higher frequency range of displacements which are typically not effectively damped by the servomechanism controlling the read/write head.

In accordance with a preferred embodiment of the invention, the sensor produces a signal proportional to the angular velocity of a shock-induced displacement between the rotating disk memory and read/write head. A signal processing circuit receives the velocity signal and noise limits the signal through a low pass filter structure. Velocity signals having a frequency range within and outside the control bandwidth of the read/write head servomechanism are additionally filtered by a high pass filter stage. The filtered higher frequency displacements are applied to a second low pass filter which integrates the velocity signal to obtain a displacement signal.

The displacement signal is proportional to both the relative angular displacement and relative linear displacement of the read/write head with respect to the memory disk. A window comparator determines whether the absolute value of the displacement exceeds a threshold displacement requiring that the read/write head be inhibited from writing to an adjacent track of the memory disk.

DESCRIPTION OF THE PREFERRED EMBODIMENT

Figure 1:
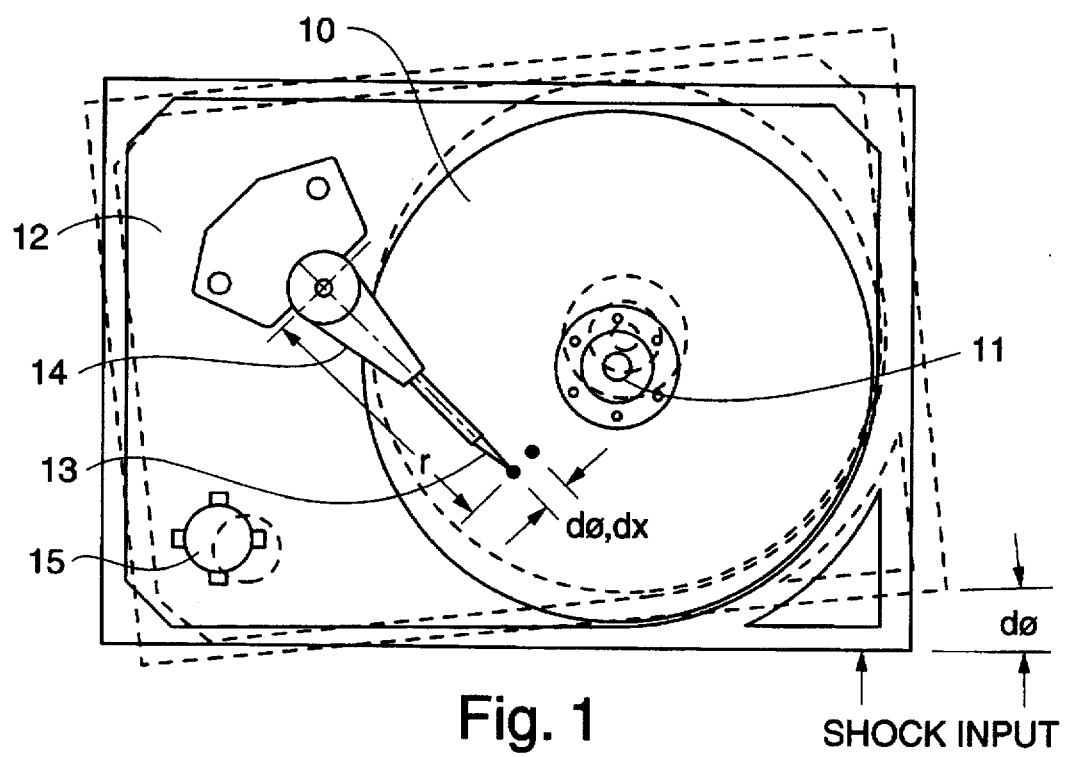
FIG. 1 illustrates a hard disk memory which is subject to shock force input.

Referring now to FIG. 1, there is shown an outline of a hard disk memory system protected from shock forces. The spinning hard disk 10, in the embodiment shown, is a magnetic disk having a plurality of radial tracks for storing digital data bits. The hard disk 10 is rotated through a drive motor connection 11, and maintained at a substantially constant speed during the read and write process.

Data is written to each of the tracks of the hard disk 10 by a read/write head 13. The read/write head 13 is positionable with respect to each track. The track can be written to or data read from the track once the read/write head 13 has been correctly located with respect to the correct track.

Positioning of the read/write head 13 is effected with a voice coil actuator 14 which is a typical servomechanism for a disk drive. The servomechanism control circuit receives position data read by the read/write head 13 as an error signal for positioning the read/write head 13 on a track. Position data bits contained within each track will permit the servomechanism to determine position errors and correct the position of the read/write head 13 in a direction to reduce any detected position errors.

FIG. 1 also illustrates a shock sensor 15, described more particularly in the aforementioned co-pending patent application, which is mounted to a printed circuit board supported by the disk drive case 12. Any shock input sustained by the spinning hard disk 10 will result in an output signal being generated by the shock sensor 15.

FIG. 1 illustrates the angular displacement $d\phi$ which results from a shock input applied to the spinning hard disk 10. When the disk drive case 12 is subject to the shock input force, an angular rotation $d\phi$ occurs between the relative position of a track on the spinning hard disk 10, and the location of the floating read/write head 13. The read/write head 13 is capable of repositioning itself in the face of such shock forces when the shock force occurs within the control bandwidth of the servomechanism. In the event the shock force is either so large, or is composed of higher frequencies outside the control bandwidth of the servomechanism so that the servomechanism cannot correct for the resulting displacements, the read/write head 13 will be inhibited from writing data by the signal from the shock sensor 15.

Linear displacements between the spinning hard disk 10 and the floating read/write head 13 which result from shock forces, are represented as an off-track error (dx). The off-track error dx is related to an angular rotation $d\phi$ by reason of $dx = rd\phi$, where r represents the distance from the read/write head to its pivot point.

The shock sensor 15 provides an output signal which is proportional to the angular velocity component, $d\phi/dt$. The shock induced angular velocity $d\phi/dt$ is signal processed to produce a signal proportional to dx, the off-track error. As will be evident from the description which follows, the detected off-track error dx is used to trigger an inhibit signal to the write head 13 to avoid any catastrophic overwrites on adjacent tracks which have been accessed by the read/write head 13 as a result of the shock-induced displacement.

Figure 2:
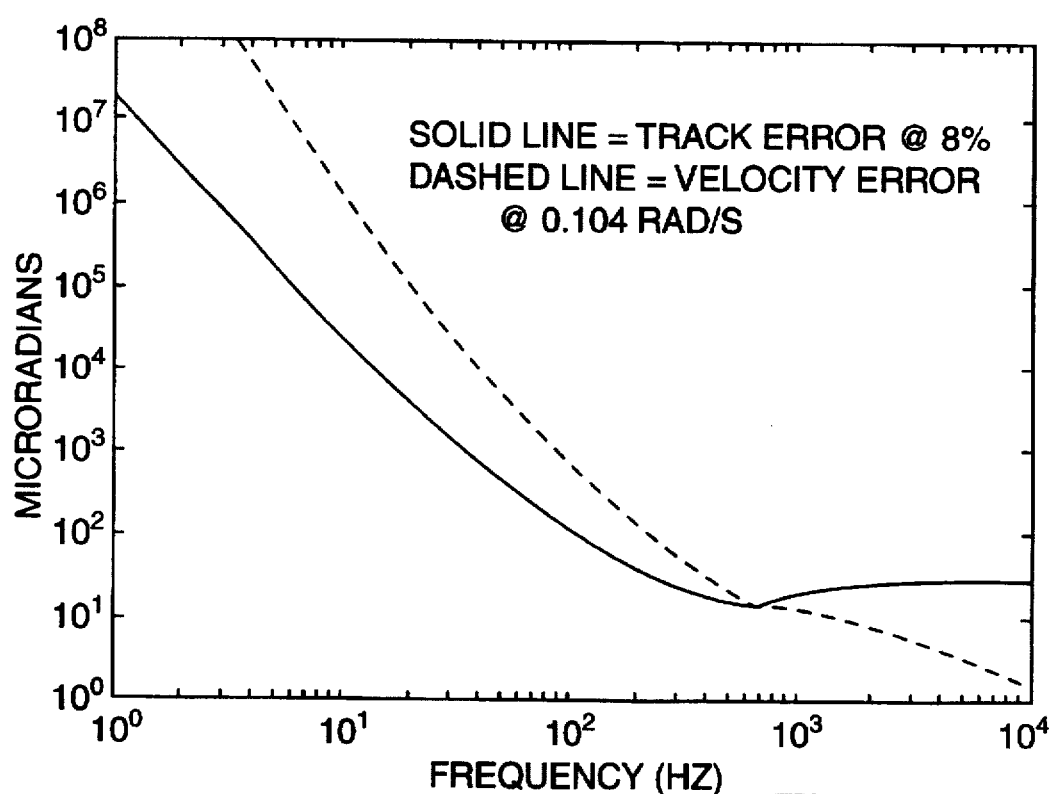
FIG. 2 is a representation of the servo-response of the hard disk memory in response to a shock force input.

The response of the servomechanism for maintaining the read/write head 13 in its tracking position within a track, is shown in FIG. 2. The solid line of FIG. 2 represents a limit of the angular displacement of the track error $d\phi$ which can be corrected by the servomechanism controlling the write head 13 via the voice coil actuator 14, to maintain a tracking error of 8%. If the limits shown in FIG. 2 are observed, the servomechanism will be able to track those displacements which occur at the frequencies shown without any additional protection to the hard disk memory.

The off-track error $d\phi$ above the shown tracking error limit of 8% represents conditions where the servomechanism does not reliably correct for shock-induced displacements. FIG. 2 also shows the circumferential displacement error when the velocity error for the spinning hard disk 10 is 0.104 radians per second.

The preferred embodiment of the invention seeks to determine when displacements in excess of a tracking error of 8% result from an applied shock force. Those skilled in the art should recognize that a particular tracking error criteria may be different for different disk drives or other devices for which shock protection is provided. The limit identified in FIG. 2 is exemplary only, and other limits may be selected and used in accordance with the present invention as a criteria for enabling shock protection.

It is clear that at the lower frequencies, i.e., below 100 Hz., and most definitely below 10 Hz., the servomechanism for positioning the read/write head 13 in a data track is very effective at suppressing linear tracking error displacements dx incurred from shock forces. However, in the 100 Hz. region and above, very small displacements will result in a tracking error exceeding 8%, thus jeopardizing a catastrophic overwrite to an adjacent track of the hard disk.

The preferred embodiment of this invention has been specifically designed to sense excessive displacements incurred above 100 Hz. Experience has shown that shock forces having dominant frequency components in the region of 100 Hz. to 1000 Hz. represent a significantly occurring event, which produces catastrophic overwrites and must be reliably detected. Shock forces greater than 1,000 Hz are protected by inertia damping at −20 db/decade. Shock forces which produce displacements $d\phi$ with dominant frequency contents greater than 2000 Hz. tend to be a rarer occurrence, and produce smaller displacements. Above 10,000 Hz., these displacements may be ignored without significant loss in shock protection.

The sensor in accordance with the aforesaid co-pending patent application, provides an output signal proportional to $d\phi/dt$, the angular velocity. This signal is used as an input signal to a signal processing circuit which will generate a WRITE INHIBIT signal when track error (dx) displacements above the selected criteria are observed.

Figure 3:
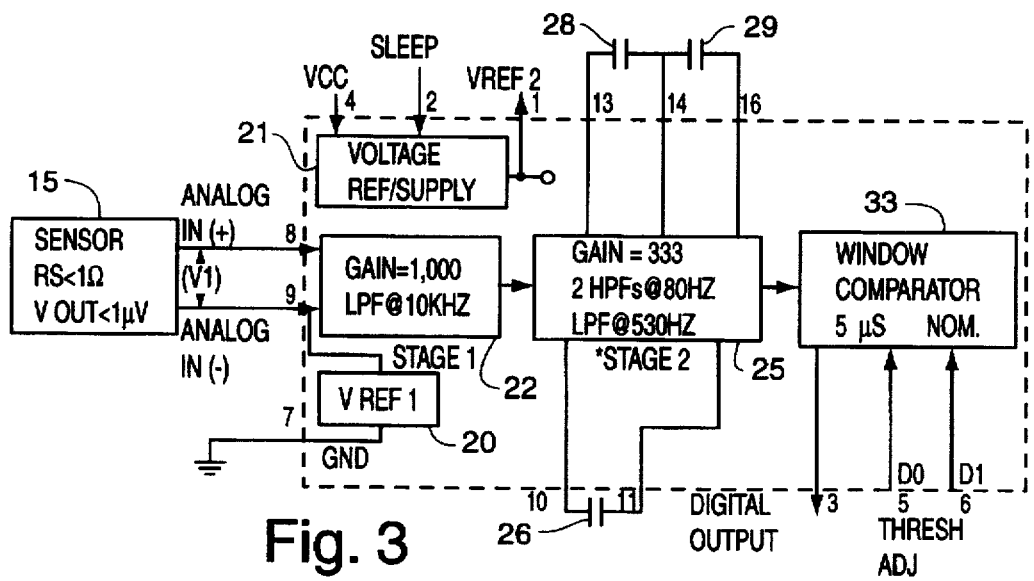
FIG. 3 is a block diagram of the signal processing device for detecting shock-induced displacement between the hard disk memory and read/write head.

Referring to FIG. 3, there is shown a block diagram of a signal processing circuit for generating a digital output signal constituting an INHIBIT signal to the read/write head of FIG. 1. The signal processing circuit of FIG. 3 is implemented as an integrated circuit. The sensor 15 in accordance with the preferred embodiment of the aforementioned co-pending application, produces an analog voltage of a microvolt or more, at an impedance of less than 1 Ohm. The output voltage proportional to the angular shock velocity $d\phi/dt$ increases in frequency at a substantially linear rate until a knee or corner frequency of 40 Hz. is obtained. Beyond 40 Hz., the output from the sensor 15 is substantially constant for angular shock velocities $d\phi/dt$ of increasing frequency.

The low level signal from the sensor 15 is supplied to a low noise amplifier filter stage 22. The amplifier filter stage 22 provides a gain of 1000 with a low pass filter function having a first corner frequency of approximately 10 kHz. A voltage reference supply 21 is shown which will establish a reference level for a window comparator 33. A voltage reference supply 20 will establish a bias voltage for the low noise amplifier filter stage input amplifier.

The signal produced from the active low pass filter 22 is further applied to a second filter stage 25. The filtering provided by the active filter stage 25, having a gain of between 100 to 1,000, provides a further low pass filter function having a corner frequency at 530 Hz., as well as a double pole high pass filter function having a corner frequency of 80 Hz.

The high pass filter function will essentially filter those displacements of FIG. 2 which lie below 100 Hz., which are within the control bandwidth of the read/write servomechanism. The double pole high pass filter function is established by the capacitor 26 and capacitor 29. The low pass filter response for stage 25 is established by the value of capacitor 28 to the active filter stage 25.

The frequency response of the active filter stages 22 and 25 can be defined in the S/frequency plane as follows:

$$[V2(s)/V1(s)] = 3.33e5[s/(s+2\pi 80)]^2[(2\pi 530)/(s+2\pi 530)][(2\pi 1e4)/(s+2\pi 1e4)]$$

The frequency response identified by V2(s)/V1(s) may be seen by observing the AC-coupled signal at pin 16 of the signal processing integrated circuit of FIG. 3.

Figure 5:
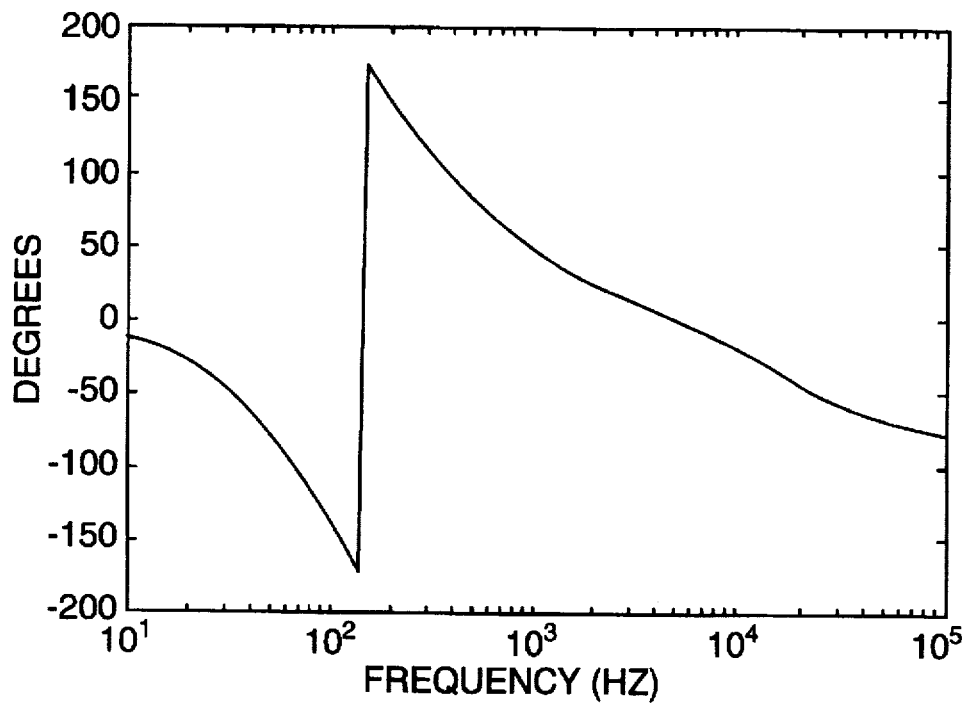
FIG. 5 is the phase response of the circuit shown in FIGS. 3 and 4.
Figure 6:
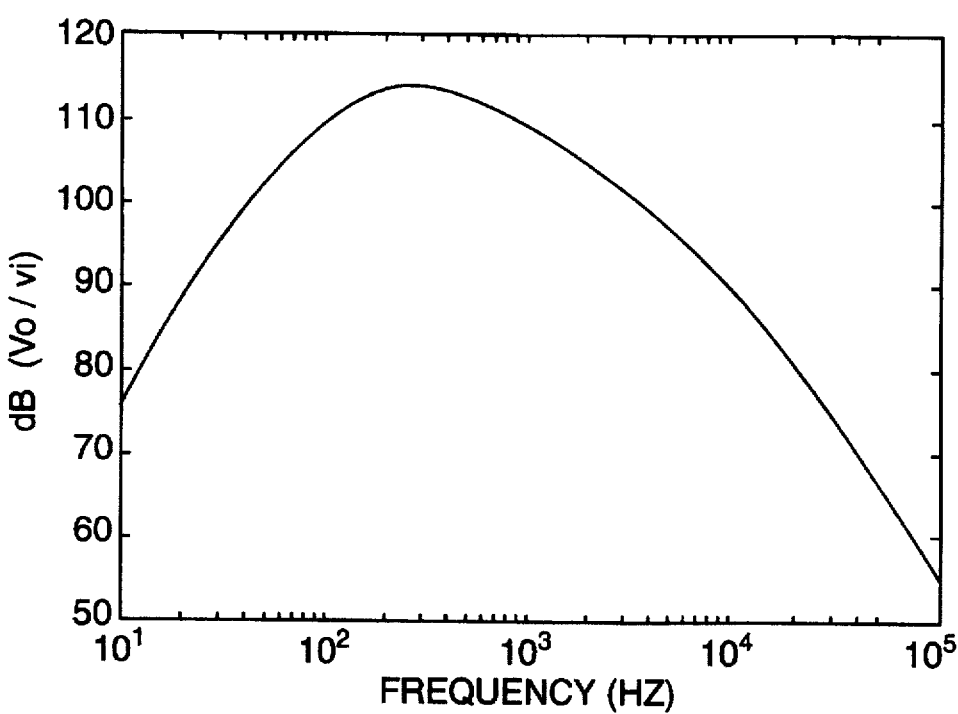
FIG. 6 is the amplitude response of the signal processing circuit of FIGS. 3 and 4 before comparison with the displacement threshold.

FIGS. 5 and 6 illustrate the frequency response of the active filter stages 22 and 25 of the signal processing integrated circuit. FIG. 5 is the phase response, and FIG. 6 is the amplitude (magnitude) response of filter sections 22 and 25. As can be seen, the amplitude response in the region of 100 Hz. to 1000 Hz. represents the frequency region of maximum gain for a constant amplitude input signal from sensor 15. Those signal levels below 100 Hz. are attenuated in a function which is complementary to the response of FIG. 2, illustrating the tracking error displacements versus frequency. Thus, lower frequency displacements are de-emphasized, whereas those in the region of 100 Hz. to 1000 Hz. would obtain the maximum emphasis at approximately 300 Hz.

The low pass filter structure represented by output stage 25 provides a signal which is the integral of the input sensor 15 output signal dϕ/dt representing an angular displacement dϕ for frequencies above 100 Hz. The constant r, representing the length of the read/write head pivot arm of FIG. 1, in accordance with the formula dx=rdϕ is a gain factor for the filter stage 25. The first low pass filter stage 22 provides for a 20 db per active rolloff for those frequencies above 10,000 Hz. In this way, the filter stage 22 provides for noise limiting of the displacement signal dx which is to be detected.

The filter stage 25 has a low pass filter pole at 530 Hz. and provides for integration of the angular velocity signal dϕ/dt to obtain angular displacement dϕ and correspondingly the linear displacement dx.

Those signals within the frequency range of 200 to 2,000 Hz. provide an essentially constant output displacement signal due to the presence of the pole at 530 Hz. provided by the filter stage 25. Filter stage 25 also provides high pass filter represented by the term $^s/(s+2\pi 80)$, with a corner frequency of 80 Hz.

The resulting constant displacement signal is applied to a window comparator circuit 33. The window comparator circuit 33 will detect the absolute value of any displacement signal, AC coupled via capacitor 29 from the filter stage 25, which exceeds a threshold displacement. Thus, the direction of the force input and resulting displacement direction is ignored, and only those displacements having a magnitude greater than a threshold level, corresponding to an 8% track error of FIG. 2, are used to generate an INHIBIT signal for disabling the WRITE current to a read/write head. The window comparator preferably has a 5 microsecond typical or nominal response time, and a 5 millivolt offset.

The window comparator output signal is applied via inverters 34 and output pin 3, to control circuitry of the read/write head 13. The circuitry can be configured such that the INHIBIT signal is either logic '0' or logic '1', depending on the application. Displacements which are in excess of the solid line tracking error of 8% shown in FIG. 2 result in a shut-down of the writing operation, avoiding any catastrophic overwrite of the adjacent tracks of a magnetic memory hard disk 10.

As can be seen from FIG. 3, the particular frequency response of the filter stages 22 and 25 can be controlled by the outboard circuit components 26, 28 and 29. By making suitable changes to these circuit components, the magnitude and phase response represented by FIGS. 5 and 6 can be controlled such that other applications for sensing shock conditions and instituting protective measures may be implemented by selective changes in the foregoing components. The component selection represented in FIG. 3 is unique to the particular displacement threshold represented by the tracking error of 8% of FIG. 2. Other thresholds could be established to obtain a threshold condition representing another displacement versus frequency shock limit.

Figure 4:
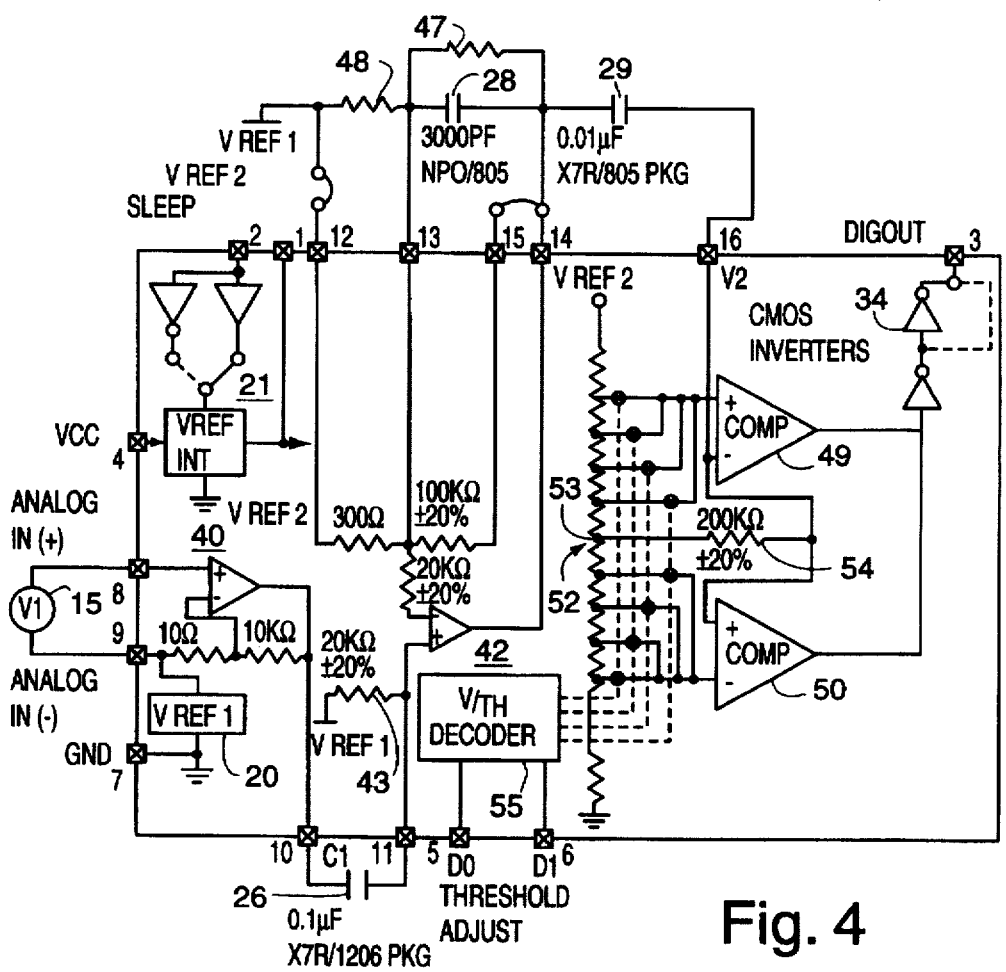
FIG. 4 is a schematic drawing of the signal processing circuit of FIG. 3.

FIG. 4 represents the specific circuit elements necessary to implement the signal processing integrated circuit of FIG. 3. The first stage to receive the sensor 15 output signal is a low noise non-inverting amplifier 40, having a gain of at least 1,000, and biased by a reference voltage $V_{REF1}$ by reference voltage generator 20. The low pass filter function of stage 22 referred to in FIG. 3, having a corner frequency at 10 kHz. is obtained by the internal slew rate limitations of amplifier 40.

The capacitor 26 is connected between the output of amplifier 40 and the input of non-inverting amplifier 42, and will be in cooperation with the internal resistance represented by resistor 43 and the input impedance of operational amplifier 42, setting the high pass filter corner frequency. Capacitor 28 for setting the low pass filter corner frequency of 530 Hz. is shown connected between terminals 13, 14 and 15 of the integrated circuit package. Optional resistance elements 47 and 48 are shown for further controlling the response of this low pass filter function.

The window comparator 33 includes a pair of comparators 49 and 50, having an inverting and non-inverting input, respectively, connected to receive the filter signal via capacitor 29. The reference level for establishing the switching point for comparators 49 and 50 is obtained through a ladder network 52 having a plurality of taps associated therewith. The ladder network 52 has a tap 53 which, through resistor 54, establishes the same potential on the inverting and non-inverting inputs of comparators 49 and 50, such that a predetermined window exists around a nominal voltage $V_{REF2}$ supplied by reference voltage generator 21. By changing the logic level applied to pins 5 and 6 of the integrated circuit, the decoder 55 selects the threshold voltge above and below the nominal voltage of $V_{REF2}$ at which the comparator switches. In the preferred embodiment, threshold voltage of ±35, ±50, ±70 or ±100 millivolts may be selected via logic levels on pins 5 and 6.

Thus, it is seen that an integrated circuit is provided having an appropriate filter function which will provide for a constant displacement signal representing a track error displacement experienced by a hard disk memory. Displacements above a set threshold level directed by the window comparator will result in shut-down of the write current and avoid any catastrophic overwrites on an adjacent track.

It should be noted that the particular sensor used in accordance with the co-pending patent application provides an output proportional to an angular velocity component $d\phi/dt$. It is clear that other sensors, having outputs representative of a shock-induced displacement, which may measure other related parameters such as acceleration $d\phi^2/dt^2$, angular velocity $d\phi/dt$, angular displacement $d\phi$, or track error linear displacement $dx$, may be implemented in accordance with the principles of the present invention, and an appropriate filter function obtained for these sensor output signals, such that when a shock condition is experienced which requires shut-down of some feature of the protected system, such condition will be recognized by the signal processing circuit.

Thus, there has been described with respect to one embodiment of the invention, an apparatus for protecting a memory disk system from an applied shock force. Those skilled in the art will recognize yet other embodiments described more particularly by the claims which follow.

What is claimed is:

1. A circuit for inhibiting writing by a servo-controlled writing head on a memory media, when a shock force causes a displacement of said memory media with respect to said writing head, comprising:

a motion sensor providing a head motion related signal representing a shock force induced displacement between said memory media and writing head, said head motion related signal comprising a head velocity signal;

an active filter circuit for filtering and processing said motion related signal to obtain a displacement signal within a frequency range outside of an effective control range of said servo-controlled writing head; and a threshold detector for providing a WRITE INHIBIT signal when said displacement signal exceeds a threshold displacement value;

wherein said active filter circuit includes:
   circuit means for filtering said motion related signal to avoid providing said WRITE INHIBIT signal in response to signals having a frequency less than a first predetermined frequency, for filtering said motion related signal to avoid providing said WRITE INHIBIT signal in response to signals having a frequency greater than a second predetermined frequency, said second predetermined frequency being greater than said first predetermined frequency, and for processing said motion related signal to provide said WRITE INHIBIT signal when said displacement signal exceeds said threshold displacement value, said circuit means comprising means for integrating said velocity signal to provide said displacement signal.

2. The circuit according to claim 1, wherein said circuit means of said active filter circuit comprises a first low pass filter for noise limiting said motion related signal.

3. The circuit of claim 1, wherein said circuit means has an amplitude response which decreases at a first rate for frequencies above 1,000 Hz and at a second rate at frequencies above 10,000 Hz.

* * * * *